United States Patent
Lee et al.

(10) Patent No.: US 10,033,024 B2
(45) Date of Patent: Jul. 24, 2018

(54) SEPARATOR AND ELECTROCHEMICAL DEVICE HAVING THE SAME

(71) Applicants: LG Chem, Ltd., Seoul (KR); TORAY INDUSTRIES, INC., Tokyo (JP)

(72) Inventors: Joo-Sung Lee, Daejeon (KR); Sun-Mi Jin, Daejeon (KR); Jong Hun Kim, Daejeon (KR); Jeong-Min Ha, Daejeon (KR); Bo-Kyung Ryu, Daejeon (KR); Jin-Woo Kim, Daejeon (KR)

(73) Assignees: LG Chem, Ltd. (KR); TORAY INDUSTRIES, INC. (JP)

( * ) Notice: Subject to any disclaimer, the term of this patent is extended or adjusted under 35 U.S.C. 154(b) by 244 days.

(21) Appl. No.: 13/920,505

(22) Filed: Jun. 18, 2013

(65) Prior Publication Data

US 2013/0280583 A1    Oct. 24, 2013

Related U.S. Application Data

(63) Continuation of application No. PCT/KR2012/009484, filed on Nov. 9, 2012.

(30) Foreign Application Priority Data

Nov. 11, 2011   (KR) .................. 10-2011-0117862
Nov. 9, 2012    (KR) .................. 10-2012-0126795

(51) Int. Cl.
*H01M 2/16*     (2006.01)
*H01M 2/14*     (2006.01)
(Continued)

(52) U.S. Cl.
CPC ......... *H01M 2/1686* (2013.01); *H01M 2/145* (2013.01); *H01M 2/166* (2013.01);
(Continued)

(58) Field of Classification Search
CPC ...... H01M 2/145; H01M 2/162; H01M 2/166; H01M 2/168; H01M 2/1686;
(Continued)

(56) References Cited

U.S. PATENT DOCUMENTS 6,265,059 B1 *   7/2001  Kono .................. C08J 5/18
                                                      428/313.5
2006/0008700 A1 *  1/2006  Yong et al. ............ 429/144
(Continued)

FOREIGN PATENT DOCUMENTS

EP   1043782 A2   10/2000
EP   2741345 A2    6/2014
(Continued)

OTHER PUBLICATIONS

International Search Report for Application No. PCT/KR2012/009484 dated Feb. 21, 2013.
(Continued)

*Primary Examiner* — Mark F. Huff
*Assistant Examiner* — Omar M Kekia
(74) *Attorney, Agent, or Firm* — Lerner, David, Littenberg, Krumholz & Mentlik, LLP

(57) ABSTRACT

The present invention refers to a separator for an electrochemical device and an electrochemical device having the same. More specifically, the separator of the present invention comprises a porous substrate; a first porous coating layer formed on one surface of the porous substrate and comprising a mixture of inorganic particles and a first binder polymer; and a second porous coating layer formed on the other surface of the porous substrate and comprising a product obtained by drying a mixture of a solvent, a non-solvent and a second binder polymer.
Such separator of the present invention can have good thermal safety due to a porous organic-inorganic coating
(Continued)

layer formed on one surface thereof, and superior adhesiveness due to a porous coating layer made of a binder thin film formed by applying and drying a mixture of a binder polymer and a non-solvent on the other surface thereof. Also, the separator can have a decreased thickness to reduce the resistance of electrochemical device and improve the capacity thereof.

13 Claims, 1 Drawing Sheet

(51) Int. Cl.
H01M 10/42 (2006.01)
H01M 10/0525 (2010.01)
H01M 10/052 (2010.01)

(52) U.S. Cl.
CPC ............ *H01M 2/168* (2013.01); *H01M 2/162* (2013.01); *H01M 2/1653* (2013.01); *H01M 10/052* (2013.01); *H01M 10/0525* (2013.01); *H01M 10/4235* (2013.01); *Y02E 60/122* (2013.01)

(58) Field of Classification Search
CPC ............ H01M 2/1653; H01M 10/052; H01M 10/0525; H01M 10/4235; Y02E 60/122
USPC .................................................. 429/129, 144
See application file for complete search history.

(56) References Cited

U.S. PATENT DOCUMENTS

| | | | |
|---|---|---|---|
| 2007/0281206 A1* | 12/2007 | Fujikawa et al. | ............... 429/62 |
| 2009/0087728 A1 | 4/2009 | Less et al. | |
| 2009/0311589 A1* | 12/2009 | Kim | ..................... H01M 2/145 |
| | | | 429/145 |
| 2010/0124701 A1* | 5/2010 | Naoi et al. | ..................... 429/144 |
| 2010/0261047 A1 | 10/2010 | Kim et al. | |
| 2010/0316903 A1 | 12/2010 | Kim et al. | |
| 2012/0115036 A1 | 5/2012 | Lee et al. | |
| 2013/0020117 A1 | 1/2013 | Yamato | |

FOREIGN PATENT DOCUMENTS

| | | |
|---|---|---|
| JP | 2007-048738 A | 2/2007 |
| JP | 2009-535764 A | 10/2009 |
| JP | 2010-067358 A | 3/2010 |
| JP | 2011-023186 A | 2/2011 |
| KR | 20070106416 A | 11/2007 |
| KR | 1020080095770 | 10/2008 |
| KR | 1020080101043 A | 11/2008 |
| KR | 1020080106718 A | 12/2008 |
| KR | 1020100120952 A | 11/2010 |
| KR | 20110097715 A | 8/2011 |
| TW | 200640674 | 12/2006 |
| TW | 200931702 A | 7/2009 |
| TW | 200935644 A | 8/2009 |
| TW | 201129476 A | 9/2011 |
| WO | 03/012896 A1 | 2/2003 |
| WO | 2006/068428 A1 | 6/2006 |

OTHER PUBLICATIONS

Search Report from European Application No. 12847056A, dated Jan. 29, 2016.
Supplemental Partial Search Report from European Appln. No. 12847056A, dated Oct. 15, 2015.

* cited by examiner

SEPARATOR AND ELECTROCHEMICAL DEVICE HAVING THE SAME

CROSS-REFERENCE TO RELATED APPLICATION

The present application is a continuation of International Application No. PCT/KR2012/009484 filed on Nov. 9, 2012, which claims priority to Korean Patent Application No. 10-2011-0117862 filed in the Republic of Korea on Nov. 11, 2011 and Korean Patent Application No. 10-2012-0126795 filed in the Republic of Korea on Nov. 9, 2012, the disclosures of which are incorporated herein by reference.

TECHNICAL FIELD

The present invention relates to a separator for an electrochemical device such as a lithium secondary battery, and an electrochemical device having the same. More particularly, the present invention relates to a separator having a first porous coating layer comprising an organic-inorganic mixture and a second porous coating layer which is a binder layer using a non-solvent, and an electrochemical device having the same.

BACKGROUND ART

Recently, there has been an increasing interest in energy storage technology. Electrochemical devices have been widely used as energy sources in the fields of cellular phones, camcorders, notebook computers, PCs and electric cars, resulting in intensive research and development into them. In this regard, electrochemical devices are one of the subjects of great interest. Particularly, development of rechargeable secondary batteries has been the focus of attention. Recently, research and development of such batteries are focused on the designs of new electrodes and batteries to improve capacity density and specific energy.

Many secondary batteries are currently available. Among these, lithium secondary batteries developed in the early 1990's have drawn particular attention due to their advantages of higher operating voltages and much higher energy densities than conventional aqueous electrolyte-based batteries, for example, Ni-MH, Ni—Cd, and $H_2SO_4$—Pb batteries. However, such lithium ion batteries suffer from safety problems, such as fire and explosion, when encountered with the use of organic electrolytes and are disadvantageously complicated to fabricate. In attempts to overcome the disadvantages of lithium ion batteries, lithium ion polymer batteries have been developed as next-generation batteries. More research is still urgently needed to improve the relatively low capacities and insufficient low-temperature discharge capacities of lithium ion polymer batteries in comparison with lithium ion batteries.

Many companies have produced a variety of electrochemical devices with different safety characteristics. It is very important to evaluate and ensure the safety of such electrochemical devices. The most important consideration for safety is that operational failure or malfunction of electrochemical devices should not cause injury to users. For this purpose, regulatory guidelines strictly restrict potential dangers (such as fire and smoke emission) of electrochemical devices. Overheating of an electrochemical device may cause thermal runaway or a puncture of a separator may pose an increased risk of explosion. In particular, porous polyolefin substrates commonly used as separators for electrochemical devices undergo severe thermal shrinkage at a temperature of 100° C. or higher in view of their material characteristics and production processes including elongation. This thermal shrinkage behavior may cause electrical short between a cathode and an anode.

In order to solve the above safety problems of electrochemical devices, a separator comprising a highly porous substrate and a porous organic/inorganic coating layer formed by coating with a mixture of an excess of inorganic particles and a binder polymer on at least one surface of the porous substrate has been proposed. However, if the porous organic/inorganic coating layer is formed on both surfaces of the porous substrate, the thickness of the separator becomes too thick, thereby reducing the capacity of an electrochemical device and increasing the resistance thereof, and if the porous organic/inorganic coating layer is formed on one surface of the porous substrate, the adhesiveness of the other surface reduces.

DISCLOSURE

Technical Problem

The present invention is designed to solve the problems of the prior art, and therefore it is an object of the present invention to provide a separator having a porous organic-inorganic coating layer, which can have good thermal safety, low resistance and superior adhesiveness.

Technical Solution

In accordance with one aspect of the present invention, there is provided a separator comprising a porous substrate; a first porous coating layer formed on one surface of the porous substrate and comprising a mixture of inorganic particles and a first binder polymer; and a second porous coating layer formed on the other surface of the porous substrate and comprising a product obtained by drying a mixture of a solvent, a non-solvent and a second binder polymer.

The second porous coating layer may be formed on a part of the other surface of the porous substrate.

Also, the separator may further comprise an electrode-adhesive layer formed on the surface of the first porous coating layer and comprising a third binder polymer.

The porous substrate may be made of a polyolefin-based polymer, but is not particularly limited thereto. The polyolefin-based polymer is preferably selected from polyethylene, polypropylene, polybutylene and polypentene.

The solvent may be acetone, tetrahydrofuran, methylene chloride, chloroform, dimethylformamide, N-methyl-2-pyrrolidone, or cyclohexane, but is not particularly limited thereto.

Also, the non-solvent may be methanol, ethanol, isopropyl alcohol or water, but is not particularly limited thereto.

In the present invention, the solvent and the non-solvent are preferably used in a weight ratio of 50:50 to 99:1.

The inorganic particles used in the present invention may be inorganic particles having a dielectric constant of 5 or higher, inorganic particles having the ability to transport lithium ions, or a mixture thereof.

Examples of the inorganic particles having a dielectric constant of 5 or higher include $BaTiO_3$, $Pb(Zr_x,Ti_{1-x})O_3$ (PZT, 0<x<1), $Pb_{1-x}La_xZr_{1-y}Ti_yO_3$ (PLZT, 0<x<1, 0<y<1), $(1-x)Pb(Mg_{1/3}Nb_{2/3})O_3$-$xPbTiO_3$ (PMN-PT, 0<x<1), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC, $TiO_2$ inorganic particles and a mixture thereof, but are not particularly limited thereto.

Also, examples of the inorganic particles having the ability to transport lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ type glass ($Li_xSi_yS_z$, $0<x<3$, $0<y<2$, $0<z<4$), $P_2S_5$ type glass ($Li_xP_yS_z$, $0<x<3$, $0<y<3$, $0<z<7$) inorganic particles, and a mixture thereof, but are not limited thereto.

The separator of the present invention may be used in an electrochemical device such as a lithium secondary battery and a super capacitor device.

Advantageous Effects

The separator of the present invention can have good thermal safety due to a porous organic-inorganic coating layer formed on one surface thereof, and superior adhesiveness due to a porous coating layer made of a binder thin film formed by applying and drying a mixture of a binder polymer and a non-solvent on the other surface thereof. Also, the separator can have a decreased thickness to reduce the resistance of electrochemical device and improve the capacity thereof.

DESCRIPTION OF DRAWINGS

The accompanying drawings illustrate preferred embodiments of the present invention and, together with the foregoing disclosure, serve to provide further understanding of the technical spirit of the present invention. However, the present invention is not to be construed as being limited to the drawings.

<Explanation of Reference Numerals>

| | |
|---|---|
| 100: Separator | 10: Porous Substrate |
| 20: First Porous Coating Layer | 30: Second Porous Coating Layer |

BEST MODE

Hereinafter, the present invention will be described in detail with reference to the drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Figure 1:
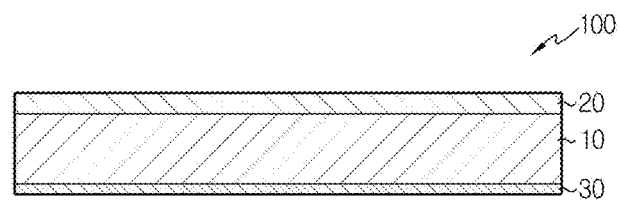
FIG. 1 shows the cross-section of a separator according to a preferred embodiment of the present invention.

FIG. 1 shows the cross-section of a separator according to a preferred embodiment of the present invention. However, the embodiments and the drawings proposed herein is just a preferable example for the purpose of illustrations only, not intended to limit the scope of the disclosure, so it should be understood that other equivalents and modifications could be made thereto without departing from the spirit and scope of the disclosure.

A separator 100 according to the present invention has a porous substrate 10; a first porous coating layer 20 formed on one surface of the porous substrate and comprising a mixture of inorganic particles and a first binder polymer; and a second porous coating layer 30 formed by applying a mixture of a solvent, a non-solvent and a second binder polymer on the other surface of the porous substrate, followed by drying.

The porous substrate 10 may be any planar porous substrate conventionally used in electrochemical devices, including a membrane or non-woven fabric form made of various polymers. For example, a polyolefin-based porous membrane which is used as a separator in electrochemical devices, particularly, a lithium secondary battery, or a non-woven fabric made of polyethylene terephthalate fiber may be used, and their material or form may be variously selected depending on a desired purpose. For example, the polyolefin-based porous membrane may be obtained from a polyolefin-based polymer, for example, polyethylene such as high-density polyethylene, linear low-density polyethylene, low-density polyethylene and ultra-high molecular weight polyethylene, polypropylene, polybutylene, polypentene or a mixture thereof, and the non-woven fabric may be obtained from a fiber made of such a polyolefin-based polymer or a polymer having a higher heat-resistance than the polyolefin-based polymer. The porous substrate has preferably a thickness of 1 to 100 μm, more preferably 5 to 50 μm, but is not particularly limited thereto. Also, the porous substrate has a pore size of 0.01 to 50 μm and a porosity of 10 to 95%, but is not particularly limited thereto.

On one surface of the porous substrate 10 according to the present invention, the first porous coating layer 20 made of a mixture of inorganic particles and a first binder polymer is formed. The first porous coating layer 20 is formed by applying a slurry comprising a mixture of inorganic particles and a first binder polymer on one surface of the porous substrate 10, followed by drying. In the first porous coating layer 20, the first binder polymer allows the adhesion of inorganic particles so that the inorganic particles can be bound with each other (i.e., the binder polymer connects and immobilizes the inorganic particle therebetween). Also, the first porous coating layer 20 comes in contact with the porous substrate 10 by the binder polymer and has adhesiveness with an electrode active material. In such porous coating layer 20, the inorganic particles are substantially present in contact with each other to form a closest packed structure, and an interstitial volume generated from the contact of the inorganic particles with each other becomes a pore of the first porous coating layer 20. The separator 100 having such a first porous coating layer 20 has good heat resistance and enhanced stability, however, may have a high electrical resistance due to the binder polymer. Accordingly, in order to minimize an electrical resistance due to the binder polymer, in the separator 100 of the present invention, the first porous coating layer 20 is provided in only one surface of the porous substrate, not both surfaces thereof.

In addition, if the first porous coating layer 20 made of a mixture of inorganic particles and a first binder polymer is formed on both surfaces of the porous substrate, the thickness of the separator becomes thick, thereby deteriorating the capacity of electrochemical devices. Accordingly, in the present invention, the first porous coating layer 20 is formed on only one surface of the porous substrate 10 to improve the capacity of electrochemical devices. Meanwhile, the other surface of the porous substrate 10 on which the first porous coating layer 20 is not formed may be poor in adhesiveness with an electrode. Accordingly, in order to provide superior adhesiveness with an electrode, in the separator 100 of the present invention, the second porous coating layer 30 made of a binder polymer is provided in the other side of the porous substrate. However, if the application of the binder polymer on the porous substrate is made by a conventional coating method, the binder polymer penetrates into the pores of the porous substrate to reduce the porosity of the porous substrate, thereby causing resistance increase. Accordingly, in the separator 100 of the present invention, a non-solvent is used to accelerate a phase separation between the second binder polymer and the non-solvent, thereby minimizing the penetration of the second binder polymer into the pores of the porous substrate. Also, the second porous coating layer 30 may be formed on only a part of the surface of the porous substrate to minimize the porosity decrease of the porous substrate and resistance increase.

Also, the separator may further comprise an electrode-adhesive layer formed on the surface of the first porous coating layer and comprising a third binder polymer.

The inorganic particles are not particularly limited if they are electrochemically stable. That is, the inorganic particles which may be used in the present invention are not particularly limited unless an oxidation-reduction reaction occurs in an operating voltage range (for example, 0 to 5 V based on Li/Li$^+$) of an applied electrochemical device. Particularly, inorganic particles having a high dielectric constant may be used to increase a dissociation rate of an electrolyte salt, e.g., a lithium salt, in a liquid electrolyte, thereby improving an ionic conductivity of the electrolyte.

For the foregoing reasons, the inorganic particles used in the present invention preferably include inorganic particles having a dielectric constant of 5 or higher, preferably 10 or higher.

Non-limiting examples of the inorganic particles having a dielectric constant of 5 or higher include $BaTiO_3$, $Pb(Zr_x,Ti_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3$-$xPbTiO_3$ (PMN-PT, $0<x<1$), hafnia ($HfO_2$), $SrTiO_3$, $SnO_2$, $CeO_2$, $MgO$, $NiO$, $CaO$, $ZnO$, $ZrO_2$, $SiO_2$, $Y_2O_3$, $Al_2O_3$, $TiO_2$, SiC inorganic particles and a mixture thereof.

Also, as the inorganic particles, inorganic particles having the ability to transport lithium ions, i.e., lithium-containing inorganic particles which can transfer lithium ions without holding them may be used. Non-limiting examples of the inorganic particles having the ability to transport lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), ($LiAlTiP)_xO_y$ type glass ($0<x<4$, $0<y<13$) such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitride ($Li_xN_y$, $0<x<4$, $0<y<2$) such as $Li_3N$, $SiS_2$ type glass ($Li_xSi_yS_z$, $0<x<3$, $0<y<2$, $0<z<4$) such as $Li_3PO_4$—$Li_2S$—$SiS_2$, $P_2S_5$ type glass ($Li_xP_yS_z$, $0<x<3$, $0<y<3$, $0<z<7$) such as $LiI$—$Li_2S$—$P_2S_5$, and a mixture thereof.

The inorganic particles are not particularly limited to their size, but preferably have an average diameter of 0.001 to 10 μm for the formation of a coating layer having a uniform thickness and a proper porosity. When the average diameter of the inorganic particles is less than 0.001 the dispersion of the particles may deteriorate. When the average diameter of the inorganic particles is higher than 10 the thickness of the coating layer formed may increase.

The binder polymer has preferably a glass transition temperature ($T_g$) of −200 to 200° C. so as to improve the mechanical properties such as flexibility and elasticity of the coating layer finally formed.

Also, the binder polymer is not necessarily required to have ionic conductivity, however, a polymer having ionic conductivity may be used to improve the performances of electrochemical devices. Accordingly, the binder polymer used in the present invention preferably includes one having a high dielectric constant. Actually, the dissociation rate of a salt in an electrolyte solution depends on a dielectric constant of the electrolyte solution. Therefore, as the dielectric constant of the binder polymer is higher, the dissociation rate of a salt in an electrolyte solution increases. In this regard, in the present invention, the binder polymer may have a dielectric constant of 1.0 to 100 (measuring frequency=1 kHz), preferably 10 or higher.

In addition, the binder polymer may be gelatinized when impregnated with a liquid electrolyte solution to exhibit a high wettability with the electrolyte solution. In this regard, it is preferred that the binder polymer has a solubility parameter of 15 to 45 $MPa^{1/2}$, more preferably 15 to 25 $MPa^{1/2}$, most preferably 30 to 45 $MPa^{1/2}$. Accordingly, a hydrophilic polymer having many polar groups is favorably used as compared to a hydrophobic polymer such as polyolefine. When the solubility parameter of the polymer is less than 15 $MPa^{1/2}$ or higher than 45 $MPa^{1/2}$, the polymer is difficult to be impregnated with a conventional liquid electrolyte solution for a battery.

Non-limiting examples of the binder polymer include polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinyl acetate, polyvinyl alcohol, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose and a low molecular compound having a molecular weight of 10,000 g/mol or less.

The inorganic particles and the binder polymer are preferably used in a weight ratio of 50:50 to 99:1, more preferably 70:30 to 95:5. When the weight ratio of the inorganic particles and the binder polymer is less than 50:50, the amount of the polymer increases to reduce the pore size and porosity of the coating layer formed. When the amount of the inorganic particles is higher than 99 parts by weight, the amount of the polymer decreases to lower the anti-peeling property of the coating layer formed.

The first porous coating layer 20 is formed by applying a slurry obtained by dissolving a mixture of inorganic particles and the first binder polymer in a solvent on one surface of the porous substrate and drying the applied slurry. It is preferred that the solvent used in the slurry has a solubility parameter similar to that of the binder polymer to be used and a low boiling point, so as to achieve uniform mixture and easy removal of the solvent afterward. Non-limiting examples of the solvent which may be used in the present invention include acetone, tetrahydrofuran, methylene chloride, chloroform, dimethylformamide, N-methyl-2-pyrrolidone (NMP), cyclohexane, and a mixture thereof.

The non-solvent may be methanol, ethanol, isopropyl alcohol or water, and may be suitably selected depending on the kind of the second binder polymer to be used. The solvent and the non-solvent are preferably used by mixing with each other in a weight ratio of 50:50 to 99:1, and applied on the other surface of the porous substrate, followed by drying, to form the second coating layer 30. When the amount of the non-solvent is higher than 50 wt %, gelatinization occurs to make it difficult to prepare a binder solution. When the amount of the non-solvent is less than 1 wt %, it is difficult to obtain an effect due to the use of the non-solvent.

The second coating layer preferably has a thickness of 0.5 to 5 µm.

Thus, the separator having multiple functional layers according to the present invention may be used as a separator of an electrochemical device, which is interposed between cathode and anode electrodes, wherein the first porous coating layer made of an inorganic material in the separator prevents a short circuit between the cathode and the anode even under the overheating condition.

The electrochemical device of the present invention may be any device in which electrochemical reactions may occur, and specific examples of the electrochemical devices include all kinds of primary batteries, secondary batteries, fuel cells, solar cells or capacitors such as a super capacitor. In particular, among the secondary batteries, lithium secondary batteries including a lithium metal secondary battery, a lithium ion secondary battery, a lithium polymer secondary battery or a lithium ion polymer secondary battery are preferred.

The electrochemical device of the present invention can selectively use an electrolyte obtained by dissolving a salt in an organic solvent. The salt has a structure represented by $A^+B^-$ wherein $A^+$ is an alkali metal cation such as $Li^+$, $Na^+$, $K^+$ and a combination thereof and $B^-$ is an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ and a combination thereof. Examples of the organic solvent include propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone and a mixture thereof, but are not limited thereto.

The electrolyte may be introduced in any suitable step during the manufacturing of the electrochemical device depending on the manufacturing processes and desired physical properties of a final product. Specifically, the electrolyte may be introduced before assembling a battery or in the final step of the assembling.

The separator of the present invention may be interposed between the cathode and the anode of a secondary battery, and in case that a plurality of cells or electrodes are stacked to compose an electrode assembly, may be interposed between the adjacent cells or electrodes. The electrode assembly may have various forms such as simple stack, jelly-roll and stack-folding types.

In accordance with one embodiment of the present invention, the electrode assembly may be manufactured by interposing the separator of the present invention between a cathode and an anode which are coated with each of active materials, followed by sequentially winding the cathode/separator/anode. Alternatively, the electrode assembly may be manufactured by bending the cathode/separator/anode to have a constant distance, which results in an overlapped structure of a zigzag-type. Meanwhile, the winding or bending electrode assembly may comprise a plurality of electrodes and separators which are alternatively laminated, so as to provide an increased capacity.

In accordance with another embodiment of the present invention, the electrode assembly may be manufactured by laminating the cathode/separator/anode or the anode/separator/cathode as a repeating unit, wherein the separator of the present invention is used as a separator.

In accordance with still another embodiment of the present invention, the electrode assembly may be manufactured by stacking a plurality of unit cells having a full-cell or bi-cell structure with a folding film. As the folding film, conventional insulator films or the separator of the present invention may be used. The full-cell structure means a cell structure which comprises at least one cell having a separator interposed between electrodes having different polarities, wherein the outermost electrodes have different polarities. Examples of the full-cell structure may include cathode/separator/anode and cathode/separator/anode/separator/cathode/separator structures. The bi-cell structure means a cell structure which comprises at least one cell having a separator interposed between electrodes having different polarities, wherein the outermost electrodes have the same polarity. Examples of the bi-cell structure may include a cathode/separator/anode/separator/cathode and anode/separator/cathode/separator/anode structure.

The stacking of unit cells using the folding film may be conducted in various manners. For example, a plurality of unit cells are arranged at a prescribed interval on one surface of the folding film extended in a longitudinal direction, and the arranged unit cells and the folding film are wound in one direction to manufacture an electrode assembly. The electrode assembly thus manufactured has a structure in which the unit cells are inserted between the wound folding films. As the other example, a plurality of unit cells are arranged at a prescribed interval on both surfaces of the folding film extended in a longitudinal direction, and the arranged unit cells and the folding film are wound in one direction to manufacture an electrode assembly. The electrode assembly thus manufactured has a structure in which the unit cells are inserted between the wound folding films. The arrangement intervals of the unit cells and the polarity of the outermost electrodes in each unit cell are selected so that the electrodes of the top cell and the bottom cell which are in contact with the folding film have different polarities. For example, the arrangement intervals of the unit cells and the polarity of the outermost electrodes in each unit cell may be selected to form an electrode assembly such as a cathode/separator/anode/folding film/cathode/separator/anode/folding film/cathode structure.

As another example, a plurality of unit cells are arranged at a prescribed interval on one surface of the folding film extended in a longitudinal direction, and the arranged unit cells and the folding film are bended in a zigzag form to manufacture an electrode assembly in which the unit cells are arranged between the bended folding films. The electrode assembly thus manufactured has a structure in which the unit cells are inserted between the bended and laminated folding films. As still another example, a plurality of unit cells are arranged at a prescribed interval on both surfaces of the folding film extended in a longitudinal direction, and the arranged unit cells and the folding film are bended in a zigzag form to manufacture an electrode assembly in which the unit cells are arranged between the bended folding films. The electrode assembly thus manufactured has a structure in which the unit cells are inserted between the bended and laminated folding films. The arrangement intervals of the unit cells and the polarity of the outermost electrodes in each unit cell are selected so that the electrodes of the top cell and the bottom cell which are in contact with the folding film have different polarities. For example, the arrangement intervals of the unit cells and the polarity of the outermost electrodes in each unit cell may be selected to form an electrode assembly such as a cathode/separator/anode/folding film/cathode/separator/anode/folding film/cathode structure.

The stacking of the electrodes using the folding film may be conducted in various manners. For example, a cathode and an anode may be arranged in turn on one surface of the folding film, and the arranged electrodes and the folding film are wound in one direction to manufacture an electrode assembly. The electrode assembly thus manufactured has a structure in which the electrodes are inserted between the wound folding films. As the other example, a plurality of electrodes are arranged at a prescribed interval on both surfaces of the folding film extended in a longitudinal direction, and the arranged electrodes and the folding film are wound in one direction to manufacture an electrode assembly. The electrode assembly thus manufactured has a structure in which the electrodes are inserted between the wound folding films. The arrangement intervals of the electrodes and the polarity thereof are selected so that the top and the bottom electrodes which are in contact with the folding film have different polarities. For example, the arrangement intervals of the electrodes and the polarity of each electrode may be selected to form an electrode assembly such as a cathode/folding film/anode/folding film/cathode structure.

As another example, a cathode and an anode may be arranged in turn on one surface of the folding film, and the arranged electrodes and the folding film are bended in one direction to manufacture an electrode assembly in which the electrodes are arranged between the bended folding films. The electrode assembly thus manufactured has a structure in which the electrodes are inserted between the bended and laminated folding film. As still another example, a plurality of electrodes are arranged at a prescribed interval on both surfaces of the folding film extended in a longitudinal direction, and the arranged electrodes and the folding film are bended to manufacture an electrode assembly in which the electrodes are arranged between the bended folding films. The electrode assembly thus manufactured has a structure in which the electrodes are inserted between the bended and laminated folding film. The arrangement intervals of the electrodes and the polarity thereof are selected so that the top and the bottom electrodes which are in contact with the folding film have different polarities. For example, the arrangement intervals of the electrodes and the polarity of each electrode may be selected to form an electrode assembly such as a cathode/folding film/anode/folding film/cathode structure.

Meanwhile, the length of the folding film used for manufacturing an electrode assembly may be selected to allow at least one winding for the electrode assembly after the last unit cell or electrode is stacked as mentioned above. However, the electrode assembly may be taken in various other forms, and its form is not particularly limited in the present invention.

Hereinafter, various preferred examples of the present invention will be described in detail for better understanding. However, the examples of the present invention may be modified in various ways, and they should not be interpreted as limiting the scope of the invention. The examples of the present invention are just for better understanding of the invention to persons having ordinary skill in the art.

EXAMPLE

Example 1: Manufacture of Separator Having Porous Organic-Inorganic Coating Layer and Binder Thin Film Using Non-Solvent Polyvinylidene fluoride-chlorotrifluoroethylene (PVdF-CTFE) copolymer and cyanoethylpullulan were each added in a weight ratio of 10:2 to acetone and dissolved at 50° C. for about 12 hours, to obtain a first polymer solution. To the first polymer solution, $Al_2O_3$ powders as inorganic particles were added so that the weight ratio of the polymer and the inorganic particles was 10:90, and then the inorganic particles were pulverized and dispersed by way of a ball mill method for 12 hours, to obtain a slurry containing inorganic particles having an average diameter of 600 nm.

Meanwhile, acetone and methanol were mixed in a weight ratio of 80:20, to which polyvinylidene fluoride-hexafluoropropylene (PVdF-HFP) copolymer was added and dissolved at 50° C. for about 12 hours, to obtain a second polymer solution.

The slurry prepared above was coated on one surface of a 16 μm-thick Porous polyolefin membrane (Celgard, C210) as a substrate by way of a slot-die coating method, and the second polymer solution was coated on the other surface of the substrate by way of a roll-coating method, and then dried in an oven set to 70° C. The first porous coating layer obtained from the slurry coating was confirmed to have a thickness of 6.9 μm, and the second porous coating layer obtained from the second polymer solution using the non-solvent was confirmed to have a thickness of 0.9 μm. The separator prepared thus had a superior Gurley number of 772 sec/100 cc.

Example 2: Manufacture of Separator Having Porous Organic-Inorganic Coating Layer and Binder Thin Film Using Non-Solvent by Way of Multi-Coating Method The procedures of Example 1 were repeated except that on one surface of the porous substrate, the slurry was coated as a lower layer and then the first polymer solution was coated as an upper layer by way of a slide-slot coating method, to prepare a separator.

The first porous coating layer, in which an additional polymer thin film was further formed, was confirmed to have a thickness of 7.5 μm, and the second porous coating layer obtained from the second polymer solution using the non-solvent was confirmed to have a thickness of 0.9 μm. The separator prepared thus had a superior Gurley number of 780 sec/100 cc.

Comparative Example 1: Manufacture of Separator Having Binder Thin Film Without the Use of Non-Solvent The procedures of Example 1 were repeated except that polyvinylidene fluoride-hexafluoropropylene (PVdF-HFP) copolymer was dissolved in only acetone as a solvent in the preparation of the second polymer solution, to prepare a separator. The first porous coating layer obtained from the slurry coating was confirmed to have a thickness of 6.8 μm, and the second porous coating layer obtained from the second polymer solution using the non-solvent was confirmed to have a thickness of 0.9 μm. The separator prepared thus had a Gurley number of 1542 sec/100 cc.

Experimental Example 1: Observation of Separator Surface

Figure 2:
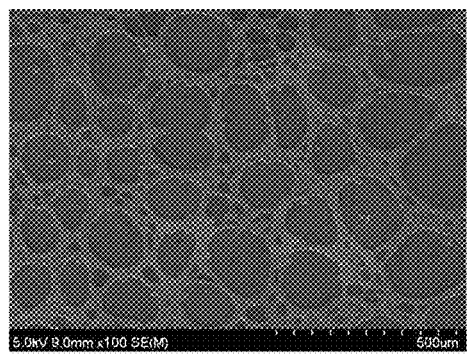
FIG. 2 is an SEM photograph of the surface of a porous coating layer made of a binder polymer thin film according to a preferred embodiment of the present invention.
Figure 3:
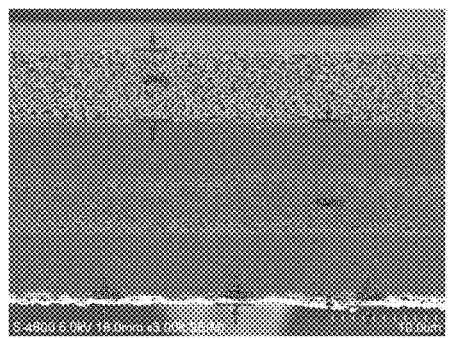
FIG. 3 is an SEM photograph of the cross-section of a separator according to a preferred embodiment of the present invention.

The SEM photographs for the surface and the cross-section of the separator prepared in Example 1 are shown in FIGS. 2 and 3, respectively.

FIG. 3 is an SEM photograph of the cross-section of a separator according to a preferred embodiment of the present invention.

Experimental Example 2: Measurement of Battery Output

Each separator prepared in Example 1 and Comparative Example 1 was interposed between a cathode and an anode, in which the first porous coating layer was in contact with the surface of the cathode and the second porous coating layer was in contact with the anode, to prepare a stacked bi-cell. The bi-cell was again welded on the second porous coating layer, followed by folding, to prepare an electrode assembly. Each electrode assembly was measured for discharging resistance under various states of charge (SOC). The results are shown in Table 1.

TABLE 1

| SOC | Ex. 1 | Com. Ex. 1 |
|---|---|---|
| 95% | 57.1 mΩ | 59.5 mΩ |
| 50% | 58.7 mΩ | 60.0 mΩ |
| 30% | 63.9 mΩ | 65.5 mΩ |

As shown in Table 1, the electrode assembly having the separator of Example 1 exhibited a lower discharging resistance than that of Comparative Example 1.

What is claimed is:

1. A separator, comprising:
a porous substrate;
a first porous coating layer formed on a first surface of the porous substrate and comprising a mixture of inorganic particles and a first binder polymer; and
a second porous coating layer formed on a second surface of the porous substrate opposite the first surface and consisting of a product obtained by drying a mixture of a second binder polymer, a solvent for the second binder polymer, and a non-solvent for the second binder polymer, wherein the non-solvent is selected from methanol, ethanol, isopropyl alcohol, water, and a mixture thereof,
wherein the inorganic particles of the first porous coating layer are substantially present in contact with each other to form a close packed structure, and an interstitial volume generated from the contact of the inorganic particles with each other forms a pore of the first porous coating layer, and
wherein the second porous coating layer partially covers the second surface of the porous substrate and the second porous coating layer has a thickness that is less than a thickness of the first porous coating layer.

2. The separator according to claim 1, which further comprises an electrode-adhesive layer formed on the surface of the first porous coating layer and comprising a third binder polymer.

3. The separator according to claim 1, wherein the porous substrate is made of a polyolefin-based polymer.

4. The separator according to claim 3, wherein the porous substrate is made of a polyolefin-based polymer selected from the group consisting of polyethylene, polypropylene, polybutylene and polypentene.

5. The separator according to claim 1, wherein the inorganic particles are selected from the group consisting of inorganic particles having a dielectric constant of 5 or higher, inorganic particles having the ability to transport lithium ions, and a mixture thereof.

6. The separator according to claim 5, wherein the inorganic particles having a dielectric constant of 5 or higher are selected from the group consisting of $BaTiO_3$, $Pb(Zr_x, Ti_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3$-$xPbTiO_3$ (PMN-PT, $0<x<1$), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC, $TiO_2$ inorganic particles and a mixture thereof.

7. The separator according to claim 5, wherein the inorganic particles having the ability to transport lithium ions are selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ type glass ($Li_xSi_yS_z$, $0<x<3$, $0<y<2$, $0<z<4$), $P_2S_5$ type glass ($Li_xP_yS_z$, $0<x<3$, $0<y<3$, $0<z<7$) particles, and a mixture thereof.

8. The separator according to claim 1, wherein the first binder polymer and the second binder polymer are each independently selected from the group consisting of polyvinylidene fluoride-co-hexafluoropropylene, polyvinylidene fluoride-co-trichloroethylene, polymethyl methacrylate, polybuthyl acrylate, polyacrylonitrile, polyvinylpyrrolidone, polyvinyl acetate, polyvinyl alcohol, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose, a low molecular compound having a molecular weight of 10,000 g/mol or less, and a mixture thereof.

9. The separator according to claim 1, wherein the solvent is selected from acetone, tetrahydrofuran, methylene chloride, chloroform, dimethylformamide, N-methyl-2-pyrrolidone, cyclohexane, and a mixture thereof.

10. The separator according to claim 1, wherein the weight ratio of the solvent and the non-solvent is in the range of 50:50 to 99:1.

11. The separator according to claim 2, wherein the third binder polymer is selected from the group consisting of polyvinylidene fluoride-co-hexafluoropropylene, polyvinylidene fluoride-co-trichloroethylene, polymethyl methacrylate, polybuthyl acrylate, polyacrylonitrile, polyvinylpyrrolidone, polyvinyl acetate, polyvinyl alcohol, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose, a low molecular compound having a molecular weight of 10,000 g/mol or less, and a mixture thereof.

12. An electrochemical device, comprising a cathode, an anode and a separator interposed between the cathode and the anode,
wherein the separator is the separator according to claim 1.

13. The electrochemical device according to claim 12, which is a lithium secondary battery.

\* \* \* \* \*